A. M. STANLEY.
ELECTRIC RESISTANCE WELDING.
APPLICATION FILED JAN. 23, 1915.
1,138,154.
Patented May 4, 1915.
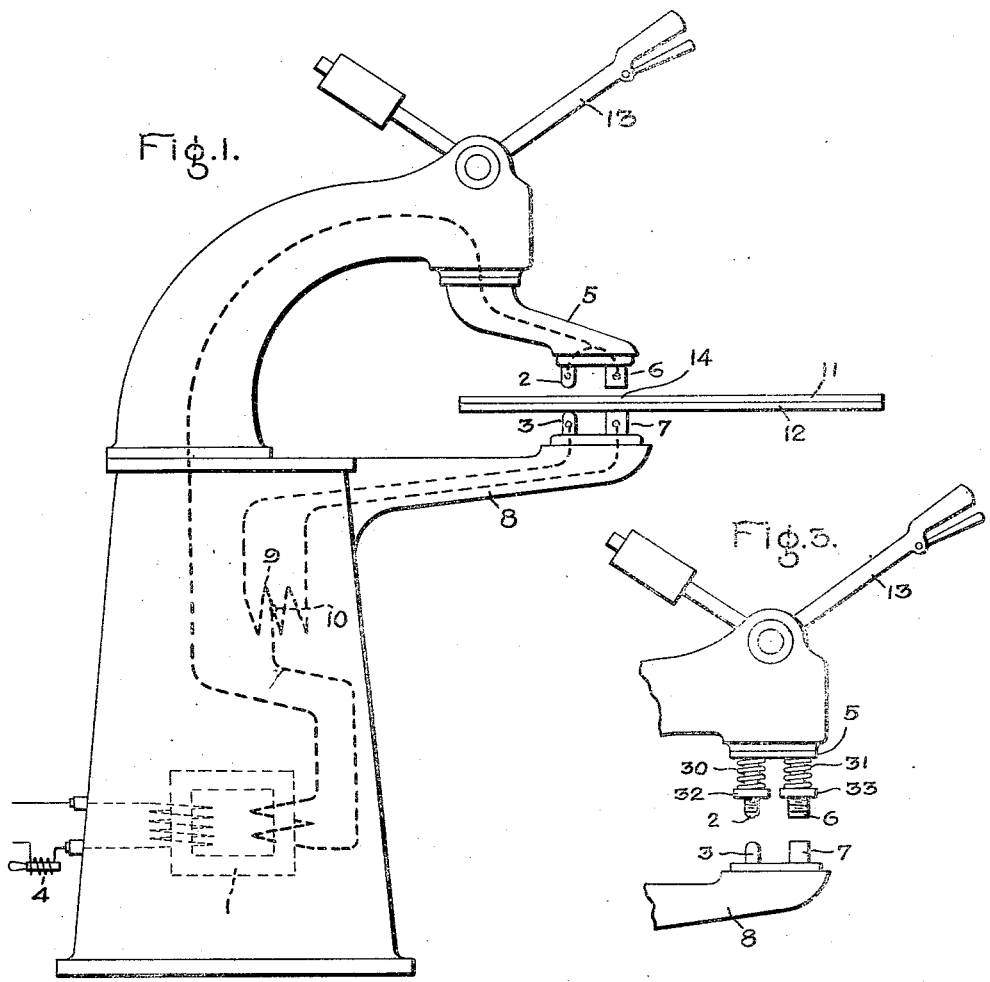
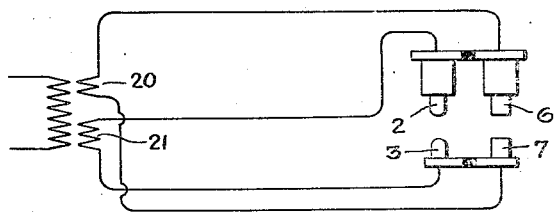
WITNESSES:
Helen Oxford
Margaret E. Wooley
INVENTOR:
ARTHUR M. STANLEY
BY Albert G. Davis
HIS ATTORNEY.

UNITED STATES PATENT OFFICE.

ARTHUR M. STANLEY, OF LYNN, MASSACHUSETTS, ASSIGNOR TO GENERAL ELECTRIC COMPANY, A CORPORATION OF NEW YORK.

ELECTRIC-RESISTANCE WELDING.

1,138,154.  Specification of Letters Patent.  Patented May 4, 1915.

Application filed January 23, 1915. Serial No. 3,947.

*To all whom it may concern:*

Be it known that I, ARTHUR M. STANLEY, a citizen of the United States, residing at Lynn, county of Essex, State of Massachusetts, have invented certain new and useful Improvements in Electric-Resistance Welding, of which the following is a specification.

My invention relates to both spot and line electric resistance welding, soldering, brazing, etc., of metal sheets, and the object of my invention is to provide the welding apparatus with means for preparing the work for the welding operation whereby the welds may be made in a more certain and satisfactory manner and with less wear on the apparatus, and whereby certain materials which prior to my invention were unadapted for this class of working may be welded successfully.

Among the difficulties encountered in electric resistance welding of sheet metal are those due to the irregular undulation of the sheets, or departures of the surfaces from true planes. To cause the metals to weld it is necessary that these undulations be straightened out and the metals brought into intimate contact at each point where they are to be united, and this has heretofore been done principally by the electrodes which carry the welding current. But since the electrodes must carry the welding current and are subject to substantially the welding heat, their working faces are quite readily distorted under the pressures to which they must be subjected for this purpose and need frequent repairing; in fact the pressures which may be supplied through them, if the electrodes are not to be destroyed so rapidly as to render the whole operation impracticable, limit the materials which may be handled. I propose to relieve the welding electrodes of considerable of this work by preparing the sheets at those points where they are to be united prior to subjecting them to the welding electrodes, subjecting them to sufficient heat and pressure between supplementary or preparatory electrodes to cause the contacting surfaces to conform to each other at those points; the sheets may indeed be somewhat slightly attached together by such preparatory electrodes, but whether the action of the preparatory electrodes is carried to this stage or is stopped somewhat short of it, considerably less pressure is required between the welding electrodes proper to produce a complete weld than is otherwise necessary. The welding electrodes therefore have a longer life. The preparatory electrodes too may be arranged to apply a greater pressure to the work than can be applied through the welding electrodes, if that becomes desirable to straighten the sheets. The amount of current required for the preparatory electrodes varies with the work, but in general it is less per unit area than for the welding electrodes, and therefore in the selection of the material of the preparatory electrodes, more consideration may be given to their mechanical strength and general fitness to sustain the pressures than to their electrical characteristics.

My invention particularly contemplates the provision of apparatus for such work. The two sets of electrodes may be supplied with current from the same source or otherwise; in case they are supplied from the same source it is necessary to provide for the proper distribution of the current therefrom by properly proportioning the resistances of the branches of the circuit, the cross areas of the engaging faces of the electrodes, their pressures on the work, by external means or in other ways, or by any combination of the various agencies. Preferably the preparatory electrodes engage somewhat greater areas of the work than do the welding electrodes, and are engaged with and disengaged from the work by the same means as the welding electrodes. Preferably also the pressures with which the two sets of electrodes engage the work are independent of each other and independently regulable.

It will be understood that wherever in this specification I use the terms "weld" or "welding," I intend to refer not only to welding proper but also to brazing, soldering and analogous operations.

In the accompanying drawings which form a part of this specification, I have illustrated more or less diagrammatically one particular type of apparatus embodying my invention.

Figure 1 is an elevation of a spot welding machine, the connections thereof being shown diagrammatically; Fig. 2 diagrammatically represents other connections for machines embodying my invention; and Fig. 3 is an elevation of a modified form of electrode mounting for welding machines involving my invention.

In Fig. 1 the welding machine is supplied with the usual transformer 1 and coöperating welding electrodes 2 and 3. The primary of the transformer is connected in series with the usual regulating reactance 4 which is here shown diagrammatically. The movable head 5 of the welding machine which carries the welding electrode 2, also carries adjacent thereto the preparatory electrode 6. The coöperating preparatory electrode 7 is carried by the stationary arm 8 which carries the welding electrode 3. The movable head 5 is moved up and down by the lever 13 to engage the electrodes with, and disengage them from the work in the well known manner. The working faces of the preparatory electrodes 6 and 7 which engage the work may be of any desired shape, but preferably these faces are of the same general shape as those of the welding electrodes and are of somewhat greater area than the faces of the welding electrodes. Both the preparatory and welding electrodes of this machine are supplied from the single secondary of the transformer 1. As before pointed out, the currents flowing through the welding electrodes and through the preparatory electrodes may be proportioned by the relative resistances of the branches of the circuit, the relative cross areas of the engaging faces of the electrodes, the relative pressures between the preparatory electrodes and between the welding electrodes, and by other factors. In this particular machine I have provided in addition a member 9 of the nature of a resistance to aid in the proper proportioning of the current supplied to the two sets of electrodes. The two ends of this member 9 are connected, one to the welding electrode 3 and the other to the preparatory electrode 7. Some mid point 10 is connected to one of the secondary terminals of the transformer 1. The mid point 10 is so selected between the ends of the member 9 as to cause the desired proportioning of the current in a well known manner. Thus, since as illustrated the point 10 is nearer the left-hand end of the member 9, the current through the welding electrodes 2 and 3 (other factors being equal) will be somewhat greater than the current through the preparatory electrodes 6 and 7. The other end of the secondary winding is connected through a simple branched circuit to the welding electrode 2 and the preparatory electrode 6.

The machine I have here illustrated is one adapted for the electrode or point type of spot welding, but it will be obvious that other forms of electrodes may be substituted for those I have illustrated for other types of resistance welding. The operation of this machine is as follows: The two sheets 11 and 12 are to be welded together. They are placed in the machine overlapping each other in substantially the position illustrated, with a spot previously prepared by the preparatory electrodes 6 and 7 located between the welding electrodes 2 and 3. The electrodes 2 and 6 are then pressed on the sheets by the handle 13 and current is passed between the preparatory electrodes and between the welding electrodes. Between the welding electrodes the sheets are welded together, and between the preparatory electrodes the sheets are pressed into intimate contact at a fresh point, the current passing between the preparatory electrodes heating the sheets sufficiently to allow the pressure exerted by them to give the sheets a permanent set conforming with each other. As before pointed out, the sheets may be slightly attached together by the preparatory electrodes, but their principal function is to cause the sheets to conform to each other at their contacting surfaces between the preparatory electrodes. The electrodes are then withdrawn from the work and the sheets 11 and 12 moved inwardly until the point 14 (previously between the preparatory electrodes) is between the welding electrodes 2 and 3. These operations may be repeated as often as desired or necessary, at each operation one prepared point being welded and a second point being prepared for welding at the next operation. The relation between the time of the application of the pressure and the time of the application of the current may follow the common present or any suitable practice. The energy supplied to the machine is, of course, regulated by the regulating reactance 4 in a manner well known.

As has been pointed out heretofore, provision for the proper proportioning of the current through the two sets of electrodes may be made in a number of ways. In Fig. 2 I have shown diagrammatically a single transformer provided with two secondary windings 20 and 21 for this purpose. The secondary winding 20 supplies the preparatory electrodes 6 and 7 and the secondary winding 21 supplies the welding electrodes 2 and 3. The numbers of turns of the respective secondaries and their locations with respect to the primary determine the current supplied to the two sets of electrodes in a manner well understood.

In general it will be found desirable that the two sets of electrodes exert different pressures on the work. In Fig. 3 I have illustrated a part of a machine wherein the pressures exerted by the two sets of electrodes are substantially independent of each other and independently regulable. The welding electrode 3 and the preparatory electrode 7 are carried by the stationary arm 8 as in Fig. 1. The welding electrode 2 and the preparatory electrode 6 are likewise carried in a movable head 5 as in Fig. 1, but they are movable in it under the control of the springs 30 and 31 respectively, which bear against the nuts 32 and 33 carried by the electrodes 2 and 6 respectively or their supporting carriers. The springs 30 and 31 may be tensioned independently of each other by the nuts 32 and 33, as will be apparent and the pressures exerted between the members of the two sets of electrodes will be dependent not only on the force exerted on the lever 13, but also on the tensions and characters of the springs 30 and 31. In such a machine the welding electrodes may be adjusted to exert the proper pressure for producing the weld and the preparatory electrodes may be adjusted to apply the pressure requisite for conforming the surfaces of the work, each substantially independent of the other.

While I have described the principle of my invention and the best mode I have contemplated for applying this principle, other modifications will occur to those skilled in this art and I aim in the appended claims to cover all modifications which do not involve a departure from the spirit and scope of my invention.

What I claim as new and desire to secure by Letters Patent of the United States, is,—

1. In an electric resistance welding machine, a stationary welding electrode, a stationary preparatory electrode, and a second welding electrode and a second preparatory electrode respectively coöperating with said first mentioned welding and preparatory electrodes, the operating faces of the preparatory electrodes being of greater area than those of the welding electrodes.

2. In an electric resistance welding machine, a stationary welding electrode, a stationary preparatory electrode, a second welding electrode and a second preparatory electrode respectively coöperating with said first mentioned welding and preparatory electrodes, and means for supplying energy to said welding and preparatory electrodes in unequal and predetermined proportions.

3. In an electric resistance welding machine, a stationary welding electrode, a stationary preparatory electrode, a second welding electrode and a second preparatory electrode respectively coöperating with said first mentioned welding and preparatory electrodes, and means for simultaneously moving said second electrodes to and from the work and for exerting pressure between said welding electrodes and between said preparatory electrodes in predetermined proportions.

In witness whereof I have hereunto set my hand this 22nd day of January, 1915.

ARTHUR M. STANLEY.

Witnesses:
 ALEX D. SALINGER,
 CHARLES E. HAYWOOD.